UNITED STATES PATENT OFFICE

1,933,064

MANUFACTURE AND STABILIZATION OF AROMATIC ALCOHOLS

Lucas P. Kyrides, St. Louis, Mo., assignor, by mesne assignments, to Monsanto Chemical Company, a corporation of Delaware No Drawing. Application March 14, 1930
Serial No. 435,966

13 Claims. (Cl. 260—153)

This invention relates to the manufacture of aromatic alcohols such as, for example, benzyl alcohol and its homologues and derivatives and it has particular application to the treatment of this class of compositions with a basic material whereby the stability and purity thereof is greatly improved.

The physical and chemical properties of aromatic alcohols, particularly benzyl alcohol, are such as to recommend them for many varied uses. However, the commercial products which have been made heretofore suffer the disadvantage of slow decomposition especially under the influence of heat, resulting in the formation of odoriferous and otherwise undesirable by-products. Thus, for example, the ordinary commercial benzyl alcohol made by hydrolysis of benzyl chloride leaves a residue varying from 3½% to 20% upon distillation under atmospheric pressure. Although redistillation of the commercial grades reduces the amount of residue this treatment is unsatisfactory since the decomposition continues and a product containing less than 3% residue is seldom obtained.

It is the object of this invention to provide a process for manufacturing aromatic alcohols which are colorless, comparatively odorless and containing little, if any, residue and further to provide a stabilized alcohol product which may be stored for extended periods of time or distilled repeatedly under atmospheric pressure without evidence of substantial amounts of residue formation.

The usual process for manufacturing benzyl alcohol consists in hydrolyzing benzyl chloride in the presence of soda ash and water, after which the hydrolyzed product is dehydrated and isolated by distillation.

According to this invention an aromatic alcohol such as benzyl alcohol, its homologues or derivatives, such as chlorbenzyl alcohol is subjected to the action of a basic material at elevated temperatures, whereby the residue forming impurities are destroyed. Subsequently the alcohol is distilled in the usual manner. Various basic compositions may be employed for this purpose, similarly various procedures may be adopted for the purpose of rendering the alcohol product stable.

Ordinary benzyl alcohol of the commercial grade as made by hydrolysis of benzyl chloride probably contains small amounts of impurities which have the property of decomposing the alcohol but which can be destroyed by subjecting the same to the action of a strong base preferably at elevated temperatures. It is conceivable that certain of the impurities which tend to decompose or catalyze the decomposition of the alcohol are chlorine addition products which have not been destroyed by the hydrolysis incident to the conversion of the benzyl chloride to the corresponding alcohol. Moreover, separation of these catalytic bodies by distillation has not proven satisfactory.

Many basic compositions may be employed for effecting the objects of this invention, depending upon the reacting conditions of the treatment. Thus, for example, a treatment which involves digesting the liquid alcohol at atmospheric pressure and at a temperature of over 100° C. gives satisfactory results by using such inorganic bases as the alkali or alkaline earth oxides, hydroxide or carbonates. The best results by this treatment have been obtained by agitating the charge vigorously and by employing substantially anhydrous alcohol. However, a hydrous product may be employed provided pressure equipment capable of maintaining the materials in liquid form at temperatures of over 100° C. is utilized. A concentrated basic solution having a boiling point substantially above 100° C. may be employed advantageously. Thus, for example, a small amount of twenty percent caustic soda solution may be added to the alcohol and refluxed at atmospheric pressure while being agitated.

In lieu of the inorganic bases very satisfactory results may be obtained by employing strong organic bases such, for example, as benzyl amine, the alkyl amines, the hydroxy alkyl amines and cyclic nitrogen compounds such as pyridine. Many of these materials offer distinct advantages over the inorganic basic compositions because of their high boiling points and solubility in benzyl alcohol and its derivatives such as chlorbenzyl alcohol. Thus, for example, triethanolamine may be added directly to the anhydrous product and digested at temperatures above 100° C. without the use of agitation or of pressure equipment. The high boiling strong organic bases have the added advantage over the corresponding low boiling bases in that they are practically odorless.

A specific example of the application of the principles of this invention is hereinafter set forth. Benzyl chloride is hydrolyzed by means of an aqueous solution of soda ash beginning at approximately 80° C., a slight excess of the required amount of soda ash being preferred. As the hydrolysis proceeds the temperature may be raised to the boiling point and the vapors refluxed for from 10 to 20 hours or longer if desired, care being exercised that the mixture remains alkaline throughout the reaction. The benzyl alcohol product may be separated from the reaction mixture in any desired manner. A small amount of dibenzyl ether by-product can be isolated advantageously by distillation.

The benzyl alcohol so prepared may be stabilized advantageously by adding about three parts of triethanolamine to each 100 parts of alcohol and maintaining the temperature of the mixture at 180–190° C. for 2–5 hours. The alkalinity of the mixture should be maintained throughout this treatment and assured, by test, from time to time. Additional base should be added in the event the material does not show an alkaline reaction. After cooling, the product is distilled in vacuum. The distillate will be found to be relatively stable.

Inasmuch as the triethanolamine boils substantially above the temperatures at which the alcohol boils, a residue results consisting in part at least of the amine, which may be recovered if desired. The presence of small amounts of the base carried over in traces during the vacuum distillation is not objectionable and in fact further improves and assures the stabilized quality of the product. A material so prepared will be found to be colorless and substantially odorless. Moreover, it is practically free of residue even after long standing and heating. This product is therefore in decided contrast to the commercial product made according to present day practice which possesses a characteristic vile odor and leaves a residue varying from 4% to 20% or even more.

As has been indicated above, the organic bases of high boiling points are to be preferred since they are soluble and may be digested easily without pressure equipment. The inorganic bases on the other hand, are practically insoluble and therefore require agitation and fine subdivision.

It will be understood, of course, that although the stabilizing treatment hereinabove set forth has been described as an additional step, this is not essential and the product may be hydrolyzed and stabilized at the same time or successively without an intervening distilling operation. A treatment which consists in heating under pressure or distilling the crude alcohol at atmospheric pressure in the presence of a stabilizing agent greatly improves the quality of the alcohol.

The inorganic bases include the oxide, hydroxide and carbonates of the alkali and alkaline earths, whereas of the strong organic bases, the alkyl amine derivatives of high boiling point are to be preferred. Bases stronger than aniline have given the best and most rapid results. It is to be noted that the more volatile organic bases may be employed particularly if pressure equipment is available. Ammonia may be added directly to the crude alcohol after hydrolysis and heated under pressure. The lower aliphatic amines may be employed in a similar manner. Because of its availability and high boiling point triethanolamine is preferred. However, the corresponding homologues including the mono and di substituted compounds may be used, all of which are practically odorless.

What I claim is:

1. An aromatic alcohol containing a small amount of a strong organic amine which is soluble in said alcohol and relatively less volatile than said alcohol.

2. A benzyl alcohol containing a small amount of an alkyl amine.

3. A benzyl alcohol containing a small amount of a tri substituted amine.

4. A benzyl alcohol containing a small amount of triethanolamine.

5. The method of treating aromatic alcohols that consists in subjecting the same to a temperature near the boiling point thereof in the presence of an amine.

6. The method of treating aromatic alcohols that consists in dehydrating the alcohol in subjecting the dehydrated alcohol to the action of an amine and maintaining the same at a temperature near the boiling point thereof.

7. In the manufacture of aromatic alcohols that step which consists in subjecting the alcohol while in liquid phase to a temperature of more than 100° C. in the presence of an organic base which is at least as strong as aniline.

8. The method of preserving aromatic alcohols which comprises incorporating therewith a small amount of an organic amine soluble therein.

9. The method of treating an aromatic alcohol that comprises distilling the same at a temperature above 100° C. in the presence of an organic amine which is relatively less volatile than the alcohol.

10. The method of stabilizing benzyl alcohol which comprises subjecting the alcohol to a temperature greater than 100° C. in the presence of an organic amine.

11. The method of preserving benzyl alcohol which comprises distilling said benzyl alcohol in the presence of a small amount of triethanolamine.

12. The method of treating benzyl alcohol that comprises distilling said alcohol in the presence of an amine which is soluble in said benzyl alcohol and relatively less volatile than said alcohol.

13. A benzyl alcohol containing a small amount of a hydroxy alkyl amine.

LUCAS P. KYRIDES.